Figure 4:
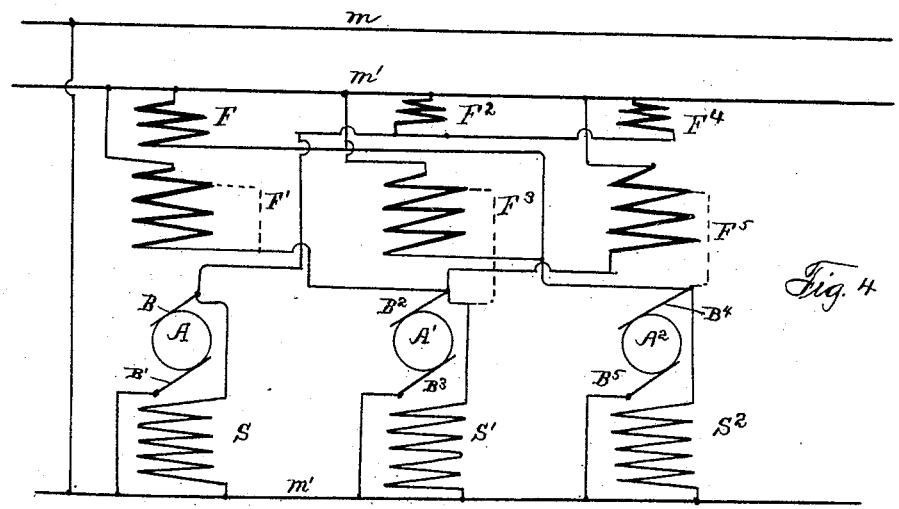

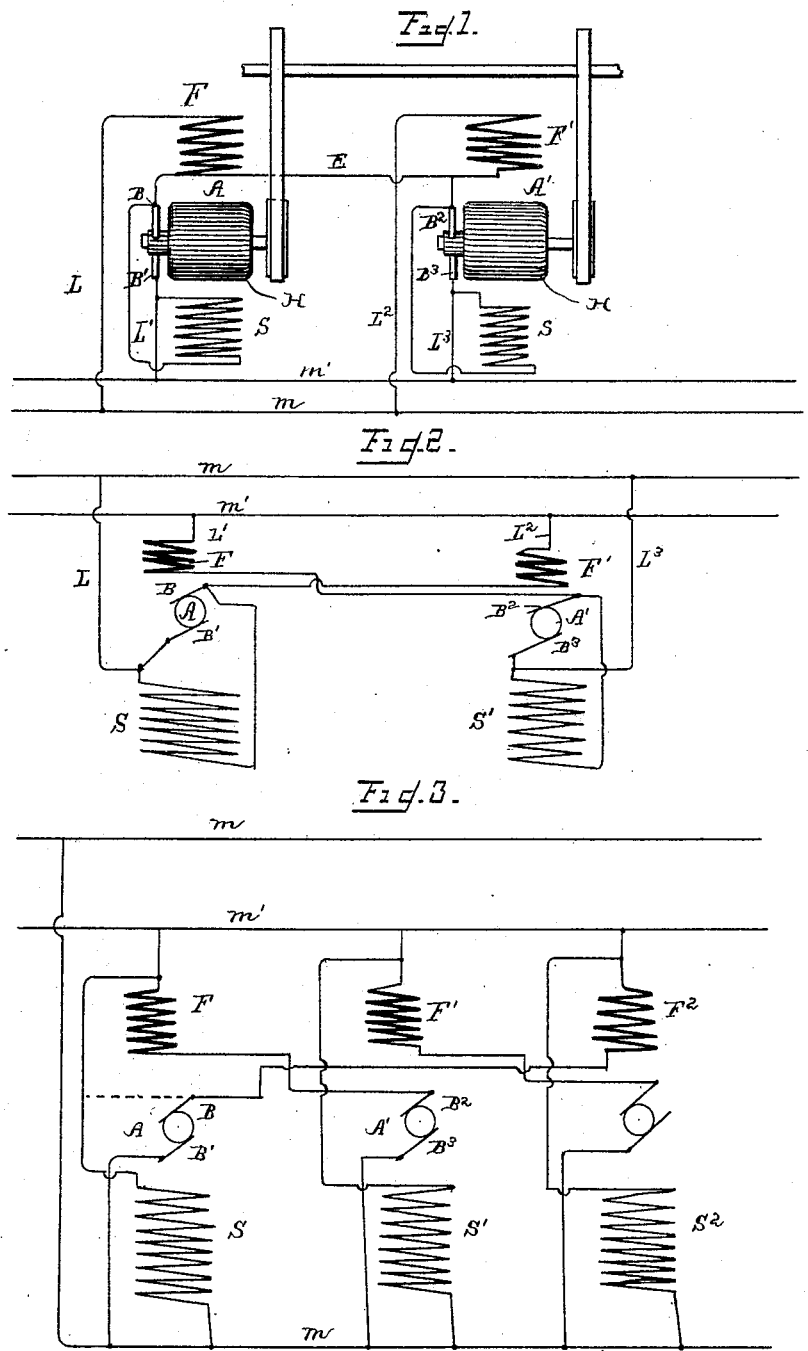

(No Model.) 2 Sheets—Sheet 2.

E. W. RICE, Jr.
COUPLING ELECTRIC MOTORS.

No. 416,746. Patented Dec. 10, 1889.

Witnesses
Ira R. Steward.
Thos. H. Capel

Inventor
E. Wilbur Rice, Jr.
By Attorney
Townsend & MacArthur

UNITED STATES PATENT OFFICE.

EDWIN WILBUR RICE, JR., OF LYNN, MASSACHUSETTS.

COUPLING ELECTRIC MOTORS.

SPECIFICATION forming part of Letters Patent No. 416,746, dated December 10, 1889.

Application filed May 7, 1888. Serial No. 273,156. (No model.)

*To all whom it may concern:*

Be it known that I, EDWIN WILBUR RICE, Jr., a citizen of the United States, and a resident of Lynn, in the county of Essex and State of Massachusetts, have invented certain new and useful Improvements in Electric Motors, of which the following is a specification.

My present invention relates to electric motors; and, briefly, its purpose is to provide an efficient means for applying the power from two or more motors to a single line of shafting in such manner that the work shall be divided in proper proportion between them.

It is found in practice that if electric motors as ordinarily constructed and connected in circuit are belted or otherwise geared or connected to the same shaft, or are otherwise applied to the same work so that they must revolve together, the results obtained are unsatisfactory, because of the fact that the work or load will be unequally or disproportionately divided. This is occasioned by the fact that it is very difficult—in fact, almost impossible—to construct electric motors so that they will, with the same rate of rotation and when supplied with current at the same potential, have precisely the same counter electro-motive force. Therefore, if two motors are connected, as ordinarily, to the same supplying-mains and operated so that they must revolve together, that motor whose armature produces the lowest counter electro-motive force will take a larger current than the other motor. The effect of this increased flow of current is with many forms of motors to greatly enhance or exaggerate the differences existing between the motors, because the magnetic field of the motor is disturbed by the increased flow, and its counter electro-motive force is thereby still further reduced. This motor, requiring a higher speed to produce a counter electro-motive force equal to that of the second motor, takes the bulk of the work and tends to drive the second motor as a generator. Thus that motor having the lowest counter electro-motive force has always the bulk of the work, and the load is unequally divided between the different motors.

It is practically impossible to make motors running under the conditions mentioned self-controlled by adjustments affecting only their own circuits; but I have found it possible and easy to perfectly regulate two or more motors connected to the same shaft by establishing a relation of mutual dependence between them, as will be hereinafter described, whereby the total load will at all times be proportionately divided between the motors according to their several capacities.

My invention consists, essentially, in making the flow of current to each of the two or more motors dependent upon the counter electro-motive force of the other or others.

Various devices might be employed for regulating the flow of current to the motor; but a convenient means is a coil upon the field-magnet of the motor, which coil may be made to operate either alone or as combined with another coil in proper manner to strengthen or weaken the field, and thereby to increase or decrease the counter electro-motive force of the motor itself, thereby cutting down or allowing an increase in the flow of current to the said motor. To make the flow of current in said coil dependent upon the counter electro-motive force of another motor, the said coil may itself be connected to the circuit of the said other motor at a point where the potential will vary with the counter electro-motive force of the same, or the flow of current in said coil may be varied by any other means without departing from the method constituting my invention, provided, however, that the determining factor is the counter electro-motive force of the other motor or motors.

While I have described the changing of the magnetism of the field as the direct means of regulating the current-flow to the motor whose share of the load tends to change, I do not of course limit myself to such special means, as it is obvious to electricians that the flow of current to a motor may be governed by other means.

The special way of carrying out the broad method by making a series field-coil of each motor carrying current dependent upon the counter electro-motive force of the other, as hereinafter described, possesses special attributes not necessarily belonging to other arrangements embodying the invention.

In the accompanying drawings I have illustrated one arrangement of motors and circuits in which my invention resides.

Figure 5:
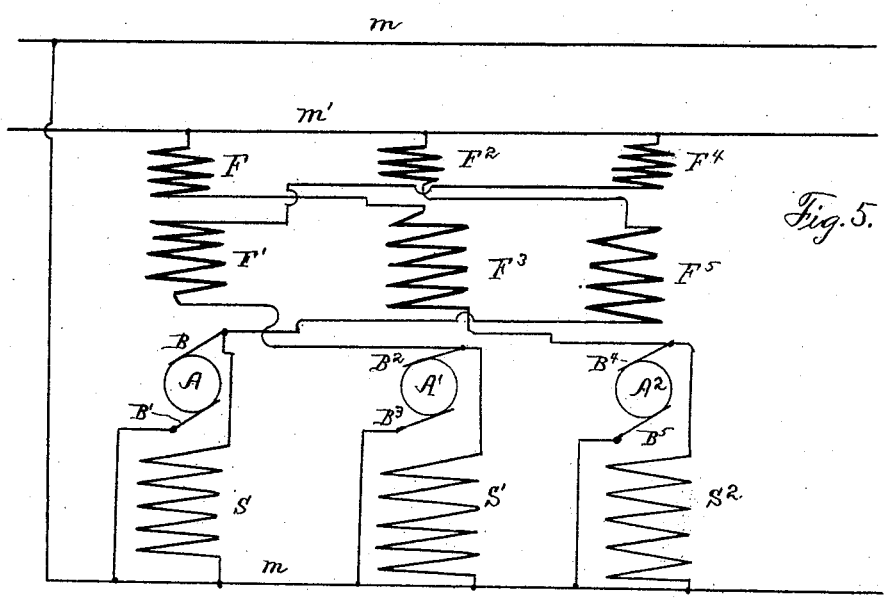

Figure 1 shows two motors with their pulleys belted to a single line of shafting connected in circuit according to my invention. Fig. 2 shows a modification of the connections in Fig. 1. Fig. 3 shows how three motors may be connected in circuit belted to a single line of shafting in accordance with my invention. Fig. 4 is a modification of the connections, Fig. 3. Fig. 5 is still a further modification.

Referring to Fig. 1, A and A' are two compound-wound motors adapted to be connected in a circuit of constant potential. H H indicate their armatures.

F' F' represent the series windings, which normally tend to cut down the magnetism due to the field-sustaining shunt-windings S S' of the two motors, respectively, and B B' B$^2$ B$^3$ their commutator-brushes. L L' L$^2$ L$^3$ show their connections to the constant-potential circuit $m$ $m'$.

E indicates a connection, preferably of as low resistance as practicable, between the series winding of each motor A A' and at a point where the potential varies with the counter electro-motive force of the other.

The operation is as follows: Suppose that the motor A is the one having the lowest counter electro-motive force at a given speed. More current would tend to flow through its armature, and the potential at the brush B would be lowered. This point of low potential, it will be seen, is fed from two sources—one through its own series field F and the other through the series field F' of the motor A and the connection E. The resistance of the connection E being very low, the increase of current to the point B is divided between the fields F F' in very nearly equal amount. The tendency to diminution in the counter electro-motive force of the motor A is therefore counteracted or compensated in two ways: First, only half the increase of current flows through its own series coil F, and, secondly and principally, the other half of the increase of current flows through the series coil F' of the motor A', reduces its field, and hence its counter electro-motive force in the same proportion as it is reduced in the motor A. In the same manner the point of lowered potential in the series circuit of the motor A' is fed partly through its own field F' and partly through the field F of the motor A. Thus any increase or decrease of potential in one motor is followed by a corresponding increase or decrease in the other motor, the counter electromotive force of the motor A governing the flow of current in the series winding of the motor A', and hence determining the flow of current to the said motor, and the counter electro-motive force of the motor A' governing the flow of current in the series winding of the motor A, and hence determining the flow of current to the same.

Fig. 2 shows a modification in the method of controlling the flow of current through the armature of one motor by the counter electromotive force of the other motor-armature. In this case the armature of the motor A takes its supply of current entirely through the series winding F' of the motor A' and the armature of the motor A' takes its current through the series winding F of the motor A. This is a preferable arrangement to that shown in Fig. 1, since the variation in current-flow as determined by the counter electro-motive force of one motor-armature acts wholly, as will be seen, to produce a corresponding and compensating variation in the strength of the magnetic field of the other motor-armature.

The other characters of reference indicate parts corresponding to those in Fig. 1.

Fig. 3 shows an extension of the connections, Fig. 2, to three motors belted or otherwise connected to a single shaft. Similar letters refer to the same parts as in the preceding figures. Here the armature of the motor A controls field F$^2$ of motor A$^2$, armature of motor A' controls the field F of motor A, and armature of motor A$^2$ controls the field F' of motor A'.

Fig. 4 is a modification of the connections shown in Fig. 2, in which each motor has two series field-windings. In this case armature of motor A controls fields F$^2$ of armature A' and F$^4$ of armature A$^2$; armature of motor A' controls fields F' of armature A and F$^5$ of armature A$^2$, and armature of motor A$^2$ controls field F of armature A and F$^3$ of armature A'—that is to say, one brush of each armature is the terminal of a multiple connection through series fields of the other two motors.

Fig. 5 is still another modification in the manner of connecting three motors, in which each armature is connected with a series coil on each of the other two motors; but said series coils, instead of being arranged in multiple, are arranged in series with one another.

It is of course understood that the number of motors to be belted or connected to a single shaft or otherwise arranged to revolve together while operating upon the same work may be increased to any extent desired by extending the connections, as indicated.

I do not herein claim the combination of two or more electric motors connected with the same work and each having a field-coil which tends to cut down the field and is connected to a point in the circuits of the other motors where the potential varies from variations in the counter electro-motive force of such other motors, as this combination and certain variations of it form the subject of claims in another application for patent filed by me October 14, 1889, Serial No. 327,244.

What I claim as my invention is—

1. The herein-described method of equalizing or proportionately distributing the load between two or more electric motors running together and having field-coils in independent branches, consisting in making the flow of current to the field-coil of each dependent upon the counter electro-motive force of the other or others.

2. The herein-described method of producing a uniform distribution of load between two or more electric motors coupled to the same work and run in parallel from constant-potential mains, consisting in making the flow of current to each dependent upon the counter electro-motive force of the other or others.

3. The herein-described method of producing a uniform distribution of the load between two or more electric motors connected in parallel to constant-potential mains and coupled to the same work, consisting in making the magnetic field of each dependent upon the counter electro-motive force of the other or others.

4. The herein-described method of determining the relative load of electric motors connected in parallel to constant-potential mains, consisting in setting up in each motor a variable magnetizing influence upon its field and regulating such influence by the counter electro-motive force of the other motor or motors.

5. The herein-described method of equalizing or proportioning the load between two electric motors coupled in multiple and running together, consisting in making the counter electro-motive force of each dependent upon the counter electro-motive force of the other or others.

E. WILBUR RICE, Jr.

Witnesses:
ELIHU THOMSON,
J. W. GIBBONEY.